Sept. 30, 1958 G. W. HILL 2,854,166

TELEPHONE AND COMMUNICATION FLOOR CONNECTION ASSEMBLY

Filed June 6, 1955

GEORGE W. HILL,
INVENTOR.

BY Lyon & Lyon

ATTORNEYS

United States Patent Office 2,854,166

Patented Sept. 30, 1958

2,854,166

TELEPHONE AND COMMUNICATION FLOOR CONNECTION ASSEMBLY

George W. Hill, Los Angeles, Calif.

Application June 6, 1955, Serial No. 513,415

4 Claims. (Cl. 220—3.3)

This invention relates to a telephone and communication floor connection assembly and more particularly to a device for installation in modern buildings for conveniently locating the connection box of telephone communication systems.

In the construction of modern office buildings, it is common to lay in the floors conduits which at convenient intervals provide vertically extending pipes through which may be led the wires of a telephone or other communication system and it is one object of this invention to provide means for connection with such pipes for attractively and conveniently locating the connection boxes of such telephone and communication systems, preferably in convenient reach of an article of furniture such as a desk without the necessity of marring the furniture by making a permanent installation of a connection box to the article of furniture.

It is another object of this invention to provide such a connection means which is simple and easy to install and attractive in appearance.

These and other objects, features and advantages will be apparent from the next specification in which.

Figure 1:
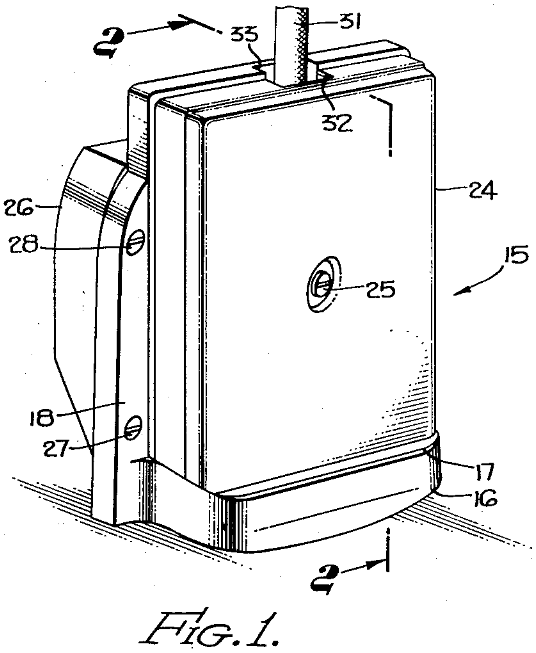
Figure 1 is a perspective view of a device embodying the present invention.
Figure 2:
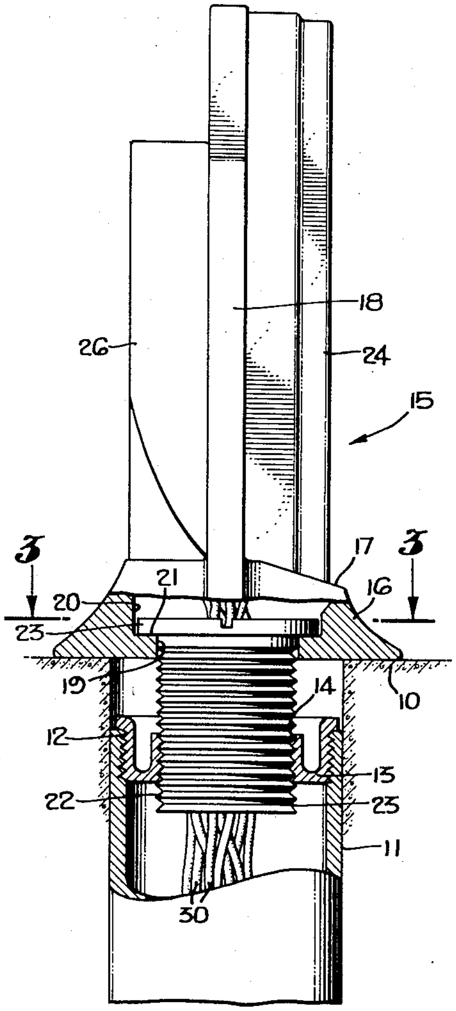
Figure 2 is an enlarged view partly in section taken along the line 2—2 of Figure 1.
Figure 3:
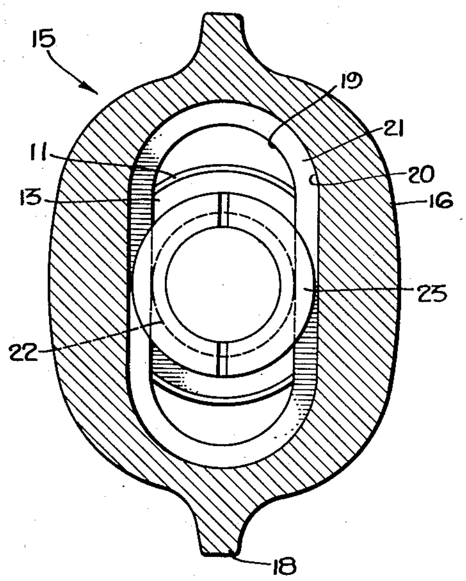
Figure 3 is a section taken along the line 3—3 of Figure 2.

Referring now more particularly to the drawings, the numeral 10 indicates a cement floor or the like in which is located a vertically extending pipe 11 having a female thread 12 in its upper end. A hollow plug 13 is threaded therein having a female thread 14 formed in the central opening therein. The device of the present invention consists essentially in a connection assembly indicated generally by a numeral 15 and including a base 16 providing a horizontally extending shelf 17 and an upwardly extending plate 18. The base 16 is provided with an elongated oval-shaped opening 19 enlarged as at 20 to provide a shoulder 21. A hollow stud 22 is provided with its cap 23 arranged to ride on the shoulder 21 when the threads 23 thereof are engaged in the threads 14 of the plug 13 as indicated in Figure 2, thus firmly affixing the base 16 on the floor 10 and in alignment with the pipe 11. The conventional connector box 24 can be affixed as by the screw 25 in the conventional manner to the plate 18. A back block 26, which may be of polished mahogany or the like, is affixed to the rear of the plate 18 by screws 27 and 28, and covers the back of the enlarged opening 20. Wires 30 housed in the pipe 11 are led through the plug 22 into the connecting connector box 24 and affixed to the connectors conventionally housed therein from which telephone cord 31 is led through openings 32 in the connector box and 33 in the back plate to the telephone and associated apparatus.

From the foregoing description, it will be apparent that by means of the telephone connection assembly herein provided, convenient attachment of all of the communication wires can be made directly in the floor wherever suitable pipes 11 are available, and a permanent, attractive installation can be made at convenient places without the necessity of any permanent connections to any articles of furniture such as a desk or the like.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claims.

I claim:

1. A floor connection assembly for telephones and the like comprising: a base having a central aperture and an enlarged aperture communicating with said central aperture and forming a shoulder defining the edge of said central aperture; a vertically extending plate integral with said base; a removable back block affixed to the rear of said plate; a front shelf on said base for removably seating a connector box; and a hollow stud in said aperture having a head adapted to seat on said shoulder to clamp said base to a floor when said stud is threaded into a female thread in said floor.

2. A floor connection assembly for telephones and the like comprising: a base having a central aperture and an enlarged aperture communicating with said central aperture and forming a shoulder defining the edge of said central aperture; a vertically extending plate integral with said base; a removable back block affixed to the rear of said plate; a front shelf on said base for removably seating a connector box; and a hollow stud in said aperture having a head adapted to seat on said shoulder to clamp said base to a floor when said stud is threaded into a female thread in said floor, said hollow stud providing a conduit for conducting communication wires from said floor to said connector box.

3. A floor connection assembly for telephones and the like comprising: a base having a central aperture and an enlarged aperture communicating with said central aperture and forming a shoulder defining the edge of said central aperture; a vertically extending plate integral with said base; a removable back block affixed to the rear of said plate; a front shelf on said base for removably seating a connector box; and a hollow stud in said aperture; a nut on said stud, said nut having a male thread adapted to mate with the female thread of a conventional floor conduit pipe, said stud having a head adapted to seat on said shoulder to clamp said base to a floor when said nut is threaded into said pipe.

4. A floor connection assembly for telephones and the like comprising: a base having a central aperture and an enlarged aperture communicating with said central aperture and forming a shoulder defining the edge of said central aperture; a vertically extending plate integral with said base; a removable back block affixed to the rear of said plate; a front shelf on said base for removably seating a connector box; and a hollow stud in said aperture; a nut on said stud, said nut having a male thread adapted to mate with the female thread of a conventional floor conduit pipe, said stud having a head adapted to seat on said shoulder to clamp said base to a floor when said nut is threaded into said pipe, said hollow stud providing a conduit for conducting communication wires from said floor to said connector box.

References Cited in the file of this patent

UNITED STATES PATENTS

| | | |
|---|---|---|
| 1,045,153 | Kennedy | Nov. 26, 1912 |
| 1,647,794 | Gibson | Nov. 1, 1927 |
| 2,327,449 | Parker | Aug. 24, 1943 |
| 2,344,788 | Popp | Mar. 21, 1944 |
| 2,414,173 | Schuman | Jan. 14, 1947 |
| 2,477,955 | Boynton | Aug. 2, 1949 |
| 2,738,892 | Wiesmann | Mar. 20, 1956 |